United States Patent Office 3,373,110

Patented Mar. 12, 1968

3,373,110

PROCESS FOR THE PREPARATION OF PLATINUM METAL CONTAINING ALUMINOSILICATES

Nai Yuen Chen, Cherry Hill, N.J., assignor to Mobil Oil Corporation, a corporation of New York No Drawing. Continuation-in-part of application Ser. No. 235,135, Nov. 2, 1962. This application Apr. 14, 1966, Ser. No. 542,455

9 Claims. (Cl. 252—455)

ABSTRACT OF THE DISCLOSURE

The invention relates to a method for preparing crystalline aluminosilicates which contain a metal of the platinum series. The invention is directed to preparing crystalline aluminosilicates by incorporating a platinum type metal in the forming or precursor solutions used for preparing crystaline aluminosilicates, followed by crystallization, washing, drying and calcining to obtain a crystalline aluminosilicate which contains a metal of the platinum series.

This application is a continuation in part of application Ser. No. 235,135 filed Nov. 2, 1962, now forfeited.

This invention relates generally to aluminosilicate catalysts and more particularly to a method for preparing aluminosilicates containing therewithin a metal of the platinum series.

Catalysts containing metals of the platinum series, i.e. metals of atomic numbers 44 to 46 and 76 to 78 inclusive, have become of considerable commercial significance in recent years. Thus, such metals impregnated on alumina and silica-alumina supports are widely employed in reforming operations to produce gasolines of high octane number. In general, supported platinum metal catalysts are capable of catalytically effecting a variety of complex hydrocarbon conversion reactions. For example, it is known that during reforming paraffin hydrocarbons undergo isomerization, naphthenes are dehydrogenated to aromatics and olefins are hydrogenated to paraffins. In each of these component reactions, however, there is, in so far as known, no marked selectivity for any particular reactant or group of reactants.

The catalyst of the present invention affords a platinum group metal-containing catalytic composition having the ability to operate selectively on certain members of one or more different reactants undergoing catalytic conversion. The selectivity attained with the new catalysts described herein is believed attributable to the solid, crystalline, zeolitic structure of the support characterized by rigid three dimensional networks and uniform interstitial dimensions in which the platinum metal component is dispersed. By associating the platinum metal in highly dispersed form with the intracrystalline spaces for the chemical reaction system which is to be catalyzed thereby, only such conversion paths are obtained which involve reactant or product molecules of such specific shapes or sizes. Such zeolites wherein only molecules of particular size and shape are able to enter are sometimes known as molecular sieves.

Accordingly, it is the primary object of this invention to provide a method for the preparation of crystalline aluminosilicates which contain a metal of the platinum series whereby the crystallinity of the aluminosilicate is substantially unaffected.

It is still another object of this invention to provide a novel process for the preparation of an aluminosilicate of the aforementioned type wherein the resulting composition possesses a high degree of selectivity and activity.

The present invention is based on the discovery that washing, drying and calcination procedures are critical process steps for obtaining platinum metal-containing crystalline aluminosilicates which have optimum catalytic selectivity and activity. Various preparational methods heretofore employed for introducing a metal of the platinum series into the interstitial channels and cavities of a crystalline aluminosilicate have been found to effect a loss of crystallinity in the resulting product which in turn adversely affects its molecular shape selective properties. Such preparations usually involve washing the aluminosilicate crystals with water in order to remove the anion portion of the platinum group metal salts. It has now been discovered that continuous washing with water causes these aluminosilicate catalysts to lose their selectivity since it appears that the crystalline aluminosilicates can transform into the amorphous form, thus releasing the trapped intracrystalline platinum group metal. It has been discovered that the crystallinity of the aluminosilicate can be retained if the washing solution has a pH of at least 10.0, preferably 10.5 to 11.5, and contains a high concentration of the same metallic ions as were present in the forming solution used to prepare the aluminosilicate, i.e. sodium ions if sodium metasilicate and sodium aluminate were employed. While not wishing to be bound by any theory of operation, it nevertheless appears that the aluminosilicate is less likely to transform into the amorphous form from the crystalline form while in the presence of the above solution. The duration of the washing step is not narrowly critical since surprisingly it has been found that the stability of the aluminosilicate is substantially unaffected by the amount of time it is in contact with the alkaline wash solution.

In preparing the platinum metal-containing aluminosilicates in accordance with the process of this invention, it has been found that it is necessary to add the salt of the particular metal, for example, tetrammine platinous chloride, directly into the forming solution for the aluminosilicate rather than base exchanging an already formed aluminosilicate with a platinum group metal. While not fully understanding the reasons why, it nevertheless appears that the inclusion of the platinum group metal into the forming solution produces a more uniform product. Therefore, in preparing a platinum aluminosilicate, for example, according to the instant invention, a solution of sodium aluminate, sodium metasilicate, and a platinum salt are poured simultaneously with stirring into a container maintained at a temperature no higher than about 110° C. with constant stirring until crystallization occurs. The particular proportion of the sodium aluminate and sodium silicate is obviously dependent upon the particular aluminosilicate desired to be synthesized. The mole ratios necessary to prepare a particular aluminosilicate are well known and are described in the patent literature, e.g., U.S. Patents 2,882,243; 2,979,381; 2,982,612; 2,996,358; 3,008,803, etc.

After formation of the platinum-metal containing aluminosilicate, the aluminosilicate is washed with an alkaline or base solution of 1 to 4 normality obtained by the addition of 1 to 4 equivalents of alkali or alkaline earth metal cations to one liter of wash solution, preferably with a solution having a normality between about 2 and 4, for a period of time sufficient to remove substantially the mother liquor from the aluminosilicate crystals. The pH of the wash solution is between about 10 and 11.5 and is preferably about 10.5. As a further embodiment of this invention, small amounts of sodium aluminate and sodium metasilicate can also be added to the wash solution since these ingredients also aid in maintaining the crystallinity of the aluminosilicate.

Following treatment with the alkaline wash solution, it is then necessary to rapidly dry the aluminosilicate in air while carefully controlling the temperature. The temperature at which the air drying should be carried out is below about 140° C. and preferably within the range of 100° to 140° C. A preferred temperature is between about 100° to 110° C. The amount of time with which the aluminosilicate is heated at this temperature is not narrowly critical and is generally no longer than 40 minutes. A preferred time period ranges from about 10 to 20 minutes.

Immediately after the air drying, it is necessary to calcine the aluminosilicate at a temperature within the range of 350° C. up to slightly below the decomposition temperature of the aluminosilicate in flowing air or other non-absorbing gas. A preferred calcination temperature is between about 380° and 460° C. The duration of the calcining step is also not narrowly critical but it has been found that about an hour is sufficient in most cases. The particularly preferred calcination procedure is to heat the aluminosilicate in a thin layer at about 400° C. for an hour in the presence of flowing air or non-absorbing gas. While not wishing to be bound by any theory of operation, it nevertheless appears that the rapid removal of water from the aluminosilicate is extremely necessary in order to maintain its selectivity and crystallinity. In view of this fact, it is preferred that both the air drying and calcination step take place in an atmosphere where there is low humidity, e.g., a low partial pressure of water, since quite obviously, drying will take place more quickly in a less humid environment.

Although the instant invention has been described with reference to the preparation of aluminosilicates with a forming solution consisting of sodium aluminate and sodium metasilicate, it is to be understood that other forming solutions, conventional in the art, can be employed in the instant process, such as potassium aluminate, potassium silicate, etc. In this case, the washing solution would contain potasium ions and have a pH of at least 10.0 and preferably about 10.5.

As still another embodiment of this invention, it is also possible to replace part or substantially all of the alkali metal cation associated with the aluminosilicate with other metallic or non metallic cations. It is known in the art to contact an aluminosilicate with a solution containing metallic or non metallic cations, e.g., calcium, ammonium, etc., in order to replace part of the original cations with another cation. This technique can also be employed after crystallization in the process of this invention with the exception that the base exchange solution must have a normality of between about 1 and 4 and a pH of at least 10.0, preferably about 10.5. In this connection, it is to be pointed out that either the unwashed reaction mixture or the washed platinum metal-containing aluminosilicate can be contacted with any desired cationic solution having the necessary pH. Typical examples of cations which can be introduced into the aluminosilicate include ammonium, calcium, barium, zinc, nickel, cobalt, and the like.

The method of the present invention may be utilized to incorporate platinum group metals in a wide variety of crystalline aluminosilicates. The method of the invention is particularly applicable to A-type crystalline aluminosilicates having a silica to alumina oxide mole ratio of less than 3. Such aluminosilicates include, among others, synthetic crystalline aluminosilicates identified as zeolites, A, T, ZK–4 and natural aluminosilicates, such as chabazite.

The amount of platinum group metal introduced into the aluminosilicate forming mixture is generally such that the ultimate crystalline zeolite contain therein an amount of metal, expressed in terms of metal, from about 0.001 percent to about 10 percent by weight, and more usually between about 0.001 percent and about 2 percent by weight.

To illustrate the improved crystallinity of the platinum metal-containing aluminosilicate catalysts prepared by the process of the instant invention, catalytic oxidation tests were run. These tests were conducted as follows:

A sample of the air dried catalyst of about 0.3 ml. was placed in a 7 mm. I.D. glass tubular reactor. It was then calcined in a flowing stream of air (10 ml./min.) for sixty minutes at 400° C. The reactor was cooled to 315° C. in helium (60 ml./min.). A three ml. slug of hydrocarbon-oxygen-helium mixture was passed through the reactor and the reaction products were analyzed on stream by gas chromatography. The composition of the slug was as follows: hydrocarbon (propylene, butane and isobutane) at 70 mm. Hg partial pressure, oxygen at 530 mm. Hg partial pressure, helium at 160 mm. Hg partial pressure.

The following examples will illustrate the novel process of this invention but it is to be understood that it is not intended to be limited thereto.

*Example I*

A platinum-containing crystalline aluminosilicate of the A-type having a high degree of crystallinity was prepared by admixing the following solutions:

(A) 92 grams of sodium aluminate (containing 41.3 weight percent $Al_2O_3$ and 35.4 weight percent $Na_2O$) and 0.8 gram of tetrammine platinous chloride ($Pt(NH_3)_4Cl_2$) dissolved in 400 ml. of distilled water at room temperature, filtered and 1 ml. of concentrated ammonium hydroxide added to the filtrate.

(B) 120 grams of sodium metasilicate ($Na_2SiO_3 \cdot 9HO$) (containing 21 weight percent $SiO_2$ and 22.9 weight percent $Na_2O$) dissolved in 400 ml. of distilled water at room temperature.

Solutions A and B are poured simultaneously with stirring into a 1500 ml. beaker at room temperature to form a white voluminous and gelatinous solid.The solid gel is next placed on a water bath and heated with stirring for two hours at about 95° C. with the addition of hot distilled water to maintain constant solution volume. At the end of two hours, the reaction mixture is heated to a temperature of about 100 to 102° C. and stirring is continued for another three hours.

30 grams of the above crystalline aluminosilicate catalyst containing platinum were decanted from its mother liquor and then slurried with a 100 ml. portion wash solution prepared by dissolving 150 grams of sodium chloride in 1000 ml. of water. The crystals were then stirred for 15 minutes in the wash solution, allowed to stand for 30 minutes and then filtered. At this point, the wash procedure was repeated an additional six times. A sample of the catalyst was then air dried at 105° C. and calcined in air at 450° C. at an air flow rate of 10 ml. per minute for one hour and then cooled to 315° C.

The above catalyst was then evaluated for the catalytic oxidation of normal butane and isobutane and extensive oxidation of both forms of butane (greater than 90%) was observed. The fact that this catalyst catalyzed the oxidation of isobutane demonstrates that its selectivity was adversely affected.

*Example II*

The procedure of Example I was repeated with the exception that 60 grams of crystalline platinum-containing aluminosilicate after decantation from its mother liquor were slurried in a 150 ml. portion wash solution prepared by dissolving 150 grams sodium chloride, 2.5 grams sodium aluminate, 2.9 grams sodium metasilicate and 2 ml. of concentrated ammonium hydroxide in 1000 ml. of water (pH 10.7). The aluminosilicate was stirred in the wash solution, allowed to stand for 30 minutes and then filtered. At this point, the entire washing procedure was repeated three additional times. The catalyst was then air dried and calcined in the identical manner as in Example I.

When this catalyst was evaluated for catalytic oxidation of a propylene-isobutane mixture, it showed no isobutane combustion, and greater than 90% oxidation of propylene, clearly demonstrating the fact that it possesses a high degree of crystallinity and selectivity.

*Example III*

The catalyst prepared according to Example II was mixed with 100 ml. of calcium acetate solution [prepared by dissolving 176 grams of calcium acetate monohydrate in 1000 ml. of water (pH 7.6)], stirred and allowed to stand for 30 minutes. The process was repeated three times followed by a water wash, after which the catalyst was air dried and calcined as set forth in Example I. The results of catalytic oxidation indicated combustion of isobutane of 47 percent thereby illustrating the destruction of crystallinity by a nearly neutral ion exchange solution.

*Example IV*

30 grams of the crystalline aluminosilicate prepared in Example II were divided into two 15 gram portions. Portion A was exchanged with an ion exchange solution containing 176 grams calcium acetate monohydrate, 2.5 grams sodium aluminate and 2.9 grams sodium metasilicate in 1000 ml. water (pH=10.7). Portion B was exchanged with an ion exchange solution containing 176 grams calcium acetate monohydrate in 1000 ml. $H_2O$ (pH=7.6). The exchange procedure was the same as described in Example III and air drying and calcination procedures were the same as in Examle I. Catalytic oxidation tests revealed that portion A was highly selective (85% n-butane, 0% i-butane combustion) and portion B was nonselective (50% n-butane, 35% i-butane combustion). The preservation of crystallinity by an alkaline solution having a pH of 10.7 is clearly demonstrated.

*Example V*

Portion B in Example 4 was divided into two portions. Portion B–1 was washed with an ion exchange solution containing 176 grams calcium acetate monohydrate, 2.5 grams sodium aluminate and 2.9 grams sodium metasilicate in 1000 ml. water. Portion B–2 was washed with an ion exchange solution containing 176 grams calcium acetate monohydrate and 1.2 grams sodium hydroxide. Both solutions had a pH of greater than 10.0. The exchange procedures were the same as described in Example III. Catalytic oxidation tests revealed that both B–1 (79% n-butane, 0% i-butane combustion) and B–2 (59% n-butane, 0.4% i-butane combustion) were highly selective. The experiment indicates that alkaline wash solution can not only preserve the crystallinity of the catalyst but also recover selectivity from a previously non-selective catalyst.

*Example VI*

In Example 4 the samples were air dried and calcined as described in Example I, i.e., calcination was carried out immediately after air drying. In this example, an air dried sample of portion A was left exposed in air for 24 hours before the air calcination step was carried out. Catalytic oxidation tests showed that by exposing the air dried sample to the surrounding atmosphere the sample lost some of its activity and selectivity (18% n-butane, 3.3% i-butane combustion). Therefore, the catalyst should be calcined immediately after air drying in order to preserve selectivity.

*Example VII*

30 grams of the crystalline aluminosilicate catalyst prepared in Example II were kept in its wash solution for 50 days, after which a sample was filtered, air dried and calcined in the same manner as described in Example I. Catalytic oxidation tests indicated more than 95% combustion of propylene, less than 5% n-butane combustion and 0% i-butane combustion. This demonstrates the stability of the selective catalyst in an alkaline medium.

*Example VIII*

Two air dried samples of portion A in Example IV were placed in a crucible and calcined in a muffle furnace at 425° C. and 480° C., respectively, and 0.3 gram of each of the calcined samples were placed in a micro-reactor. The samples were air treated and tested as described in Example I. Results showed 30% combustion of n-butane and 16% combustion of isobutane for 425° C. sample and 8% combustion of n-butane and 8% combustion of isobutane for the 480° C. sample. This demonstrates that calcination in stagnant (non-flowing air) atmosphere lowers the activity and selectivity of the catalyst.

What is claimed is:

1. In a method for the preparation of an aluminosilicate whereby an aluminum salt and silicate salt precursor solutions are reacted to form a crystalline aluminosilicate, the improvement which comprises introducing a platinum group metal into the reaction mixture prior to crystallization, washing the resulting crystals with a wash solution having a pH of at least 10.0, drying the resulting crystalline material at a temperature of less than about 140° C., calcining the resulting product at a temperature of at least about 350° C., and thereafter recovering a crystalline aluminosilicate product in which there is contained a platinum group metal.

2. The process of claim 1 wherein the washing solution has a pH from about 10.5 to 11.5.

3. The process of claim 1 wherein the drying takes place at a temperature of between about 100° to 140° C.

4. In a method for the preparation of an aluminosilicate wherein alkali metal silicate and an alkali metal aluminate precursor solutions are reacted to form a crystalline aluminosilicate, the improvement which comprises introducing a salt of a metal selected from the group consisting of platium and palladium into the reaction mixture prior to crystallization, washing the resulting crystals with a wash solution having a pH of at least 10.0, drying the resulting material at a temperature of less than about 140° C. for a period of time less than about 40 minutes, calcining at a temperature of at least 350° C., and thereafter recovering a crystalline aluminosilicate product in which there is contained a material selected from the group consisting of platinum and palladium.

5. A process for preparing a crystalline aluminosilicate which comprises reacting a solution of sodium silicate, sodium aluminate and a salt of a metal selected from the group consisting of platinum and palladium until crystallization occurs, washing the resulting crystals with a wash solution having a pH of greater than 10.0, drying the crystals at a temperature of less than about 140° C., calcining the crystals at a temperature of at least 350° C. and thereafter recovering a crystalline aluminosilicate product in which there is contained a material selected from the group consisting of platinum and palladium.

6. The process of claim 5 wherein the metal salt is a platinum salt.

7. The process of claim 5 wherein the metal salt is a palladium salt.

8. The process of claim 5 wherein the wash solution contains sodium silicate and sodium aluminate.

9. A process for preparing a crystalline aluminosilicate which comprises reacting sodium aluminate, sodium metasilicate and tetrammine platinous chloride until crystallization occurs, washing the resulting crystals with a wash solution having a pH of from 10.5 to 11.5, drying the crystals at a temperature of between about 100° C. and 140° C. for a period of time of less than 40 minutes, calcining the crystals at a temperature of at least 350° C., and thereafter recovering a crystalline aluminosilicate product in which there is contained a material selected from the group consisting of platinum and palladium.

References Cited

UNITED STATES PATENTS

| | | | |
|---|---|---|---|
| 2,971,904 | 2/1961 | Gladrow et al. | 252—455 X |
| 2,983,670 | 5/1961 | Sewbold | 252—455 X |
| 3,200,083 | 8/1965 | Milton | 252—455 |
| 1,782,353 | 11/1930 | Jaeger et al. | 23—113 X |
| 1,840,450 | 1/1932 | Jaeger et al. | 252—455 |
| 2,971,903 | 2/1961 | Kimberlin et al. | 252—455 |
| 3,140,249 | 7/1964 | Plank et al. | 252—455 |

DANIEL E. WYMAN, *Primary Examiner.*

CARL F. DEES, *Assistant Examiner.*